Sept. 3, 1957 J. W. KUNCE 2,804,650
MEANS FOR AND METHOD OF MAKING ELASTIC CUSHION ARTICLES
Filed Feb. 1, 1954 2 Sheets-Sheet 1
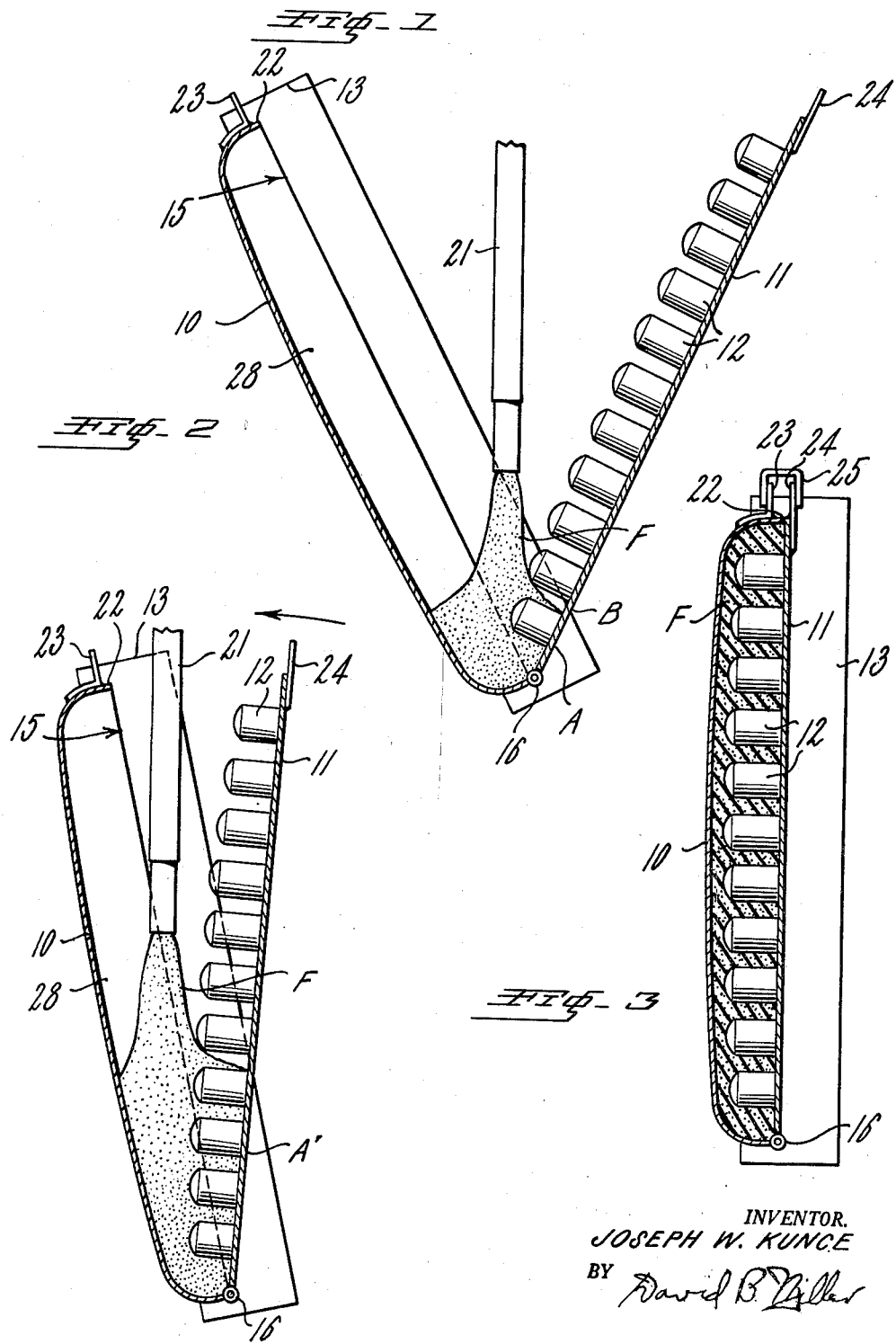
INVENTOR.
JOSEPH W. KUNCE
BY David B. Miller
ATTORNEY Sept. 3, 1957 J. W. KUNCE 2,804,650
MEANS FOR AND METHOD OF MAKING ELASTIC CUSHION ARTICLES
Filed Feb. 1, 1954 2 Sheets-Sheet 2
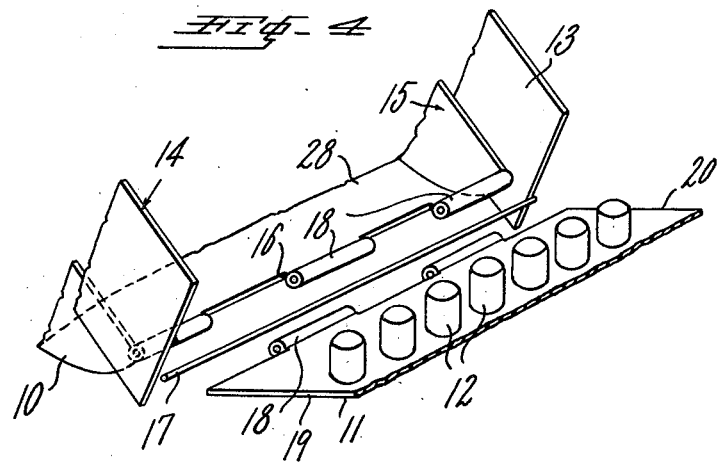
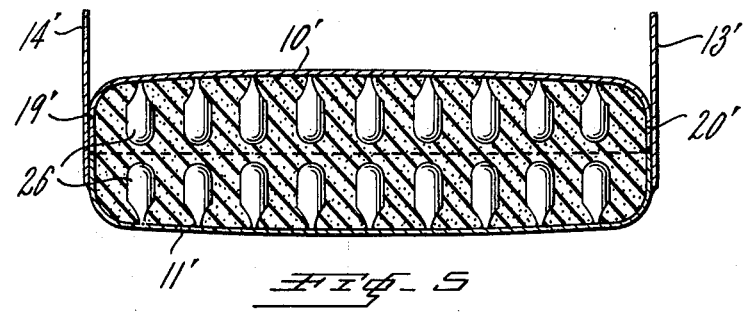
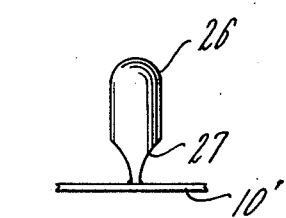 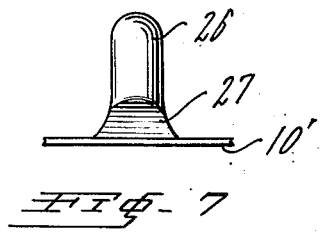
INVENTOR.
JOSEPH W. KUNCE
BY David B. Miller
ATTORNEY

United States Patent Office 2,804,650
Patented Sept. 3, 1957

2,804,650

MEANS FOR AND METHOD OF MAKING ELASTIC CUSHION ARTICLES

Joseph W. Kunce, Houston, Tex., assignor to United States Rubber Company, New York, N. Y., a corporation of New Jersey Application February 1, 1954, Serial No. 407,388

10 Claims. (Cl. 18—39)

This invention relates to a shaping mold for, and to a method of, forming elastic cushion articles.

In the rubber industry elastic cushions of foam rubber are formed in a molding pan having a molding cavity therein contoured to the external shape desired in the cushion to be produced, such for example as the shape of a pillow, a mattress or the like. A mold cover is provided for this molding pan to close the cavity. Customarily either the mold cover or molding pan carry a multiplicity of cores which are adapted to extend deeply into the mold cavity when the mold is closed, so that the cushion article formed in the mold will have a multiplicity of core holes therein formed by these cores. To form cushions utilizing these molds, a latex foam is poured into the cavity, the mold is closed, and the foam is then subjected to heat to set and vulcanize the foamed mass in the pan.

Heretofore the industry has experienced difficulty in molding these cushions because of the necessity that the molding cavity be completely filled when the mold is closed if a well shaped cushion is to be formed therein. The quantity of foam placed in the mold cavity should be sufficient to completely fill it when it is closed; if less foam is placed in the cavity, the molded article will have objectionable voids formed therein where the mold cavity was not completely filled; if more foam is placed in the mold cavity, this excess foam will be extruded from the cavity as the mold is closed to form waste rubber which is difficult to reclaim. The difficulty in filling these molds flows primarily from the use therein of cores which extend deeply in the mold cavity. If a perfectly formed cushion is to be molded in a mold having these cores therein, it is essential that the foam flow about these closely spaced cores to fill completely the spaces between the cores in the mold cavity. But foamed latex is not very fluid, and will not flow readily about these cores into the spaces between them. Consequently air is trapped between the cores within the mold cavity by the foam rubber, and when the rubber is vulcanized, objectionable voids are formed in the cushion where these trapped air pockets occur.

It is an object of this invention to provide an improved mold and a method of molding cushion articles by which cushions can be formed that are substantially free of objectionable voids in their surfaces. It is a further object of this invention to provide an improved cushion mold and method of molding cushions in which the amount of waste foam is substantially reduced or eliminated.

The cushion mold contemplated by this invention comprises a molding pan having a mold cavity therein which, if desired, may carry cores that are adapted to extend deeply into the mold cavity. This molding pan is provided along opposite sides of the molding cavity with a pair of plates which project upwardly toward the mold cover from the upper plane of the mold pan, and extend along the length of the mold cavity at these opposite sides thereof. A cover is provided for this mold that is adapted to close the mold cavity. If desired, this cover may carry cores which are constructed and arranged to extend deeply into the mold cavity. The cover is hinged to the molding pan at an end of the mold cavity which is disposed between the side plates, so that the cover may be swung about its hinges to a position in which the mold cavity is open, and to a position in registry with the mold pan to completely close the mold cavity. Since the cover is hinged to the molding pan at an end of the cavity between the side plates, and since the side plates extend along the sides of the cavity from one end thereof to the other, the mold cover will be swung between these side plates as it is moved to a mold closing position. The mold cover is constructed so that it has edges which are adapted to contact the side plates projecting from the mold pan, so that as the mold cover is closed the edges of the cover will bear against the plates to form a closed somewhat V-shaped trough. The legs of this trough are formed by the molding pan and mold cover respectively, and its apex is disposed along the hinged line where these elements are joined to each other. The ends of this trough are at least partially closed by the projection side plates. Although conceivably the side plates could be made having such a projection from the mold pan that when the mold is completely open, the mold cover will be disposed throughout the length of its sides between the side plates, it is preferred to make these side plates of a more limited projection from the mold pan so that when the molding cavity is substantially open only a limited length of the sides of the mold cover is disposed between the side plates.

In the method of forming rubber cushion articles using such a mold, the mold is first disposed with the hinged end downwardmost and the mold cover opened. A latex rubber foam is then poured, either from the customary hose or bucket, into the trough formed at the bottom of the V. Since as heretofore pointed out the side plates project only a limited distance from the surface of the mold pan, only a limited quantity of foam may be poured into this trough before it will overflow the side plates at the point where the cover leaves the space between the side plates. As the foam is poured into the trough, the mold cover is therefore swung toward its closed position on the mold pan, and as the foam rubber rises in the trough, the mold is closed progressively so that progressively more of the mold cover is swung between the side plates.

When the mold is filled in this manner, the air in the cavity will be displaced upwardly by the foam, and since the upper portions of the mold are open until the mold is completely closed, this air may escape freely to the atmosphere. As the mold is progressively closed during progressive filling thereof, sufficient foam will be retained in the lower part of the mold cavity to fill the same, and excess foam in the closed trough will be forced upwardly to fill the still void portions of the cavity until the mold cover is substantially closed on the mold pan. At this point the supply of foam may be interrupted to the mold cavity; the cover is then completely closed to extrude the latex foam which is in that portion of the trough not formed by the mold cavity upwardly into the remainder of the cavity to fill the same and to extrude a small amount of foam from the mold along the upper end thereof to insure that the mold cavity is completely filled. When the mold is completely closed, the operator may remove this small quantity of extruded foam from the end of the mold by hand or by suitable apparatus and deliver it to a tank containing the usual desensitizing fluid to reclaim this scrap rubber.

By utilizing the mold and the method of this invention, a foam cushion article can be formed which has no objectionable voids therein. Furthermore, the amount of waste foam is substantially reduced or eliminated because, firstly, the latex foam which is extruded from the mold is extruded only along one edge thereof, and secondly, this edge is disposed so that the very small amount of foam extruded in practicing this invention can be removed from the mold readily to be reclaimed. It will be apparent further that the amount of labor necessary to produce elastic cushion articles is substantially reduced by this invention from the amount required in methods heretofore used of producing cushions.

In addition to the foregoing advantages, this invention has specific advantages in molding cushion articles which are to be used as pillows and the like. In molding pillows, it has been unacceptable to have large core holes extending into the pillow from the external surfaces of the pillow. Consequently, it has been the practice heretofore to mold these pillows in halves which are subsequently cemented together to form the completed pillow. Core holes extend into the body of the pillow only from those surfaces which are later cemented together, so that no objectionable core holes occur in the surface of the pillow.

By means of the instant invention, it is contemplated that a pillow may be molded in its entirety in a single molding operation, and thus the number of molds and molding operations necessary to produce pillows can be cut substantially in half, and the cementing operation can be eliminated. This is made possible by the nature of the mold and the method of the present invention which permits molds having cores thereon to be filled with foam without trapping air in the mold cavity. Because of this advantage, it is possible to form cores having the usual cylindrical shape throughout most of their length, but having a different shape adjacent the surface of the mold to which they are attached, so that the holes extending through the surface of the pillow are smaller than the core holes in the interior of the pillow. In the methods heretofore used, cores having these reduced areas could not be used because the reduced areas would provide areas in which air would accumulate and be trapped to form objectionable voids in the surface of the pillow.

For a better understanding of the nature of this invention, reference should be had to the following description when read in conjunction with the accompanying drawings, wherein:

Fig. 1 is a side view of a mold embodying this invention;

Fig. 2 is a side view similar to Fig. 1 of the mold embodying this invention showing the mold partially closed;

Fig. 3 is a transverse sectional view of the mold in accordance with this invention showing the mold completely closed;

Fig. 4 is a perspective view of a hinged structure suitable for use in this invention;

Fig. 5 is a transverse sectional view of a modified mold in accordance with this invention suitable for use in forming a pillow or the like article;

Fig. 6 is a side elevation of one form of core suitable for use in the pillow mold shown in Fig. 5, and Fig. 7 is a side elevation of the core shown in Fig. 6 taken substantially at right angles to the view shown in Fig. 6.

Referring now to the drawing, there are shown two embodiments of molds in accordance with this invention. In the embodiment shown in Figs. 1–4, the mold comprises a mold pan 10 which has a mold cavity 28 therein having the configuration desired in the cushion article which is to be produced therein. This molding pan 10 is provided with a cover 11 adapted to close the mold cavity as is customary. In the embodiment shown this mold cover 11 comprises a plate that carries a multiplicity of cores 12 fixed thereto which are constructed and arranged to extend deeply into the mold cavity when the mold is closed.

As shown, the mold in accordance with this invention includes a pair of side plates 13, 14 which extend along the sides of the mold cavity from one end thereof to the other and which project from the surface of the mold cavity designated generally at 15 a substantial distance toward the mold cover. The mold cover 11 is hinged to the mold pan 10 along one end 16 of the mold cavity that is disposed between the side plates 13, 14. As shown in Fig. 4, the mold cover 11 may be hinged to this end 16 of the mold cavity by means of a piano hinge comprising the usual rod 17 and staggered cylindrical lips 18 on both the mold cover and mold pan. As shown in the drawings the mold cover 11 is of such a width that it extends completely between the side plates, 13, 14 so that as the mold cover 11 is swung to its closed position shown in Fig. 3 the edges 19, 20 of the mold cover will bear against the side plates 19, 20 respectively. The side plates 13, 14 extend from the upper surface of the mold cavity a distance, for example 4 or 5 inches, sufficient that a portion of the cover 11 such as that designated at A in Fig. 1 will be disposed within the confines of the side plates 13, 14 when the mold is open. Consequently, a somewhat V-shaped trough is formed by the mold pan 10 and cover 11 which trough is closed at each end adjacent the apex of the V by the side plates 13, 14.

To utilize a mold in accordance with this invention to produce an elastic cushion article, the mold is first disposed with hinged end 16 downwardmost, latex foam F from a suitable source such as the hose 21 shown in the drawings is supplied to the V-shaped trough formed by the mold when the cover is largely open as illustrated in Fig. 1. As the foam F fills this trough and nears the point B where the mold cover 11 leaves the side plates 13, 14, the mold cover 11 is moved toward the mold pan 10 to partially close the mold and to enclose a greater length, such as that shown at A' in Fig. 2, of the mold cover 11 between the side plates 13, 14. Air which fills the empty mold may escape upwardly above the surface of the foam F which is poured thereinto and escape from the open end of the mold. Filling of the mold with foam is continued as the mold cover 11 is swung progressively toward the mold pan 10 until the mold cavity is nearly filled. At that point, the hose 12 may be removed. The lower portion of the mold cavity will be filled with latex foam, and a small portion of the cavity at the upper end thereof will be empty while some excess foam will be trapped by the side plates 13, 14 and the cover 11 outside the confines of the mold cavity. As the cover plate 11 is swung to its completely closed position shown in Fig. 3 and the cores 12 forced more deeply into the mold cavity, this excess foam will be extruded upwardly and into the mold cavity to completely fill the mold cavity, and to extrude a small amount of foam along the upper end 22 of the mold. This excess foam may be removed from the edge 22 and transferred either to a new mold, or to a tank containing desensitizing solution to reclaim the rubber therein. As shown, the mold may be provided with flanges 23, 24 on the end 22 of the mold pan and cover respectively about which a clasp 25 may be fixed to hold the mold closed if desired. The filled mold is then led to a gelling station where the foam in the mold is gelled and then to a vulcanizing station where the foam is vulcanized into foam rubber as is customary heretofore.

From the foregoing, it will be apparent that the instant invention provides a novel and simple mold and method for molding foam cushion articles which will produce cushion articles that are free of objectionable voids as occur when foam is trapped within the molding cavity. Although a specific embodiment has been described wherein the side plates 13, 14 are fixed to the molding pan 10, it will be apparent that these side plates may alternately be fixed to the molding cover 11, and that additional different specific embodiments of this invention will occur to those skilled in the art. So also, although the mold cores have been shown as fixed to the mold cover 11 it will be apparent that the advantages of this invention may be achieved when the cores are fixed to the mold pan 10.

Referring next to Figs. 5–7, there is shown a mold in accordance with this invention that is satisfactory for producing cushion articles such as pillows wherein the core hole through which the core extends into the foam mass is of reduced size. As there shown, the mold comprises a pillow mold having the shape desired in a pillow. This mold includes a mold pan 10' and a mold cover 11' having the side plates 13', 14', fixed to the mold cover. As shown, the cavity forming edges 19', 20', of the mold pan are adapted to bear against the side plates 14', 13', respectively as the mold is closed. Therefore, the mold shown in Fig. 5 corresponds generally to the mold shown and described in Figs. 1–4, but in the embodiment shown in Fig. 5 both the mold pan 10' and the mold cover 11' carry a multiplicity of cores 26 fixed thereto which are adapted to extend deeply into the mold cavity.

As best shown in Figs. 6 and 7, the cores 26 have a generally cylindrical shape near their ends, but adjacent the surface forming the mold cavity to which they are affixed they are of a reduced shape. In the embodiment shown in Figs. 6 and 7, the cross-sectional area of the cores 26 have been reduced at 27 by substantially pressing together opposite sides of the core. Consequently they are joined to the mold structure along a thin somewhat elongated area. When a cushion is formed in a mold having such cores, the cushion will have large core holes interiorly thereof, but will have only the relatively thin elongated core hole extending through the surface of the pillow. Consequently the surface of the pillow will not have the objectionably large core holes extending therethrough, although the pillow will contain relatively large internal voids as is desirable in cushion articles of this type.

The feature of this invention which permits a mold to be filled without trapping air therein makes it possible to use cores of the shape shown in Figs. 6 and 7, or of similar shapes having a reduced cross-sectional area adjacent the surface of the mold. Heretofore, these reduced areas of the core, because of the limited fluidity of the latex foam and because of the manner in which the molds heretofore used need be filled, provided objectionable voids adjacent the base of the core so that the latex foam would not flow into the voids provided by this reduced area of the core. Consequently when the cushion was removed from such molds, they were found to have objectionable voids in this area, and the cushions were unsatisfactory. However, by utilizing the mold and the method of this invention, the latex foam will flow readily into these voids and adjacent the cores 26 to completely fill the mold cavity as desired. After the cushion formed in these molds has been vulcanized, the cores can readily be removed therefrom because the rubber will stretch to permit the removal of the enlarged portion of the core, and after this portion has been removed the rubber will contract to provide a cushion article having relatively small holes through its surface.

Having thus described my invention, what I claim and desire to protect by Letters Patent is:

1. A shaping mold for setting and vulcanizing a foamed latex mass without substantial compression thereof to form an elastic cushion article characterized by the absence of objectionable voids therein comprising a molding pan and closure therefor forming a mold cavity, hinges securing said molding pan and closure to each other at one end of the mold cavity, a multiplicity of individual finger-like cores secured to a surface forming said mold cavity and extending from said surface deep into the molding cavity, plates extending along the sides of the V formed by the hinged molding pan and closure near the mold cavity to form a trough to receive latex foam, said side plates being attached to said molding pan along opposite sides of said mold cavity and being constructed and arranged to close the ends of the trough continuously as said pan and closure are swung together.

2. A shaping mold for setting and curing a foamed mass without substantial compression thereof to form an elastic cushion article characterized by the absence of objectionable voids therein comprising a molding pan having a mold cavity therein, a closure for the mold cavity, said mold having a multiplicity of individual cores secured to a surface thereof and extending from said surface into the molding cavity, plates projecting from said molding pan near the mold cavity on opposite sides of the cavity, said closure being hinged to an end of the mold pan between said plates, said closure having edges constructed to engage said plates as the mold cavity is closed, whereby a trough is formed between said pan and said closure whose ends are closed by the plates as the closure is pivoted to close the mold.

3. A shaping mold according to claim 2 wherein the closure is constructed having a depressed portion therein adapted to form a part of the mold cavity.

4. A shaping mold for setting and vulcanizing a latex foamed mass without substantial compression thereof to form an elastic cushion article characterized by the absence of objectionable voids therein, comprising a mold pan having a mold cavity therein, a closure for said mold pan, a multiplicity of individual cores secured to a surface of the mold and extending from said surface into the mold cavity, said closure being hinged to said mold pan along an end of the mold cavity which is to be disposed downwardly during filling of the mold, side plates on the vertically extending sides of the mold pan adjacent to the sides of the mold cavity, said side plates extending from said mold pan towards said closure, only a limited length of the sides of said closure being disposed between said side plates when the mold is substantially open, said closure having edges which engage the surfaces of said side plates therebetween whereby a trough is formed which will be closed at its ends by the side plates as the mold is closed.

5. A mold according to claim 4 wherein the closure is constructed having a cavity therein adapted to form a part of the mold cavity.

6. A shaping mold for setting and vulcanizing a latex foamed mass without substantial compression thereof to form an elastic cushion article characterized by the absence of objectionable voids therein, comprising a mold pan having a mold cavity therein, a closure for said mold pan, said closure having a mold cavity therein, a multiplicity of individual cores secured to the surfaces of said mold pan and said closure and extending from said surfaces into the mold cavity, said cores having a reduced configuration adjacent the surfaces to which they are attached and an enlarged configuration outwardly of said reduced area, said closure being hinged to said pan along an end of said cavity, side plates along the sides of said cavity and extending between said mold pan and said closure, said side plates being attached to said mold pan along opposite sides of said mold cavity, said closure having edges which engage the surfaces of said side plates therebetween to form a trough to receive latex foam, said side plates being constructed and arranged to close the ends of said trough continuously as said pan and closure are swung together and concomitantly with the continuous charging of latex foam therto.

7. The method of forming elastic cushion articles, which comprises disposing a mold having a mold pan and a closure therefor pivoted thereto along adjacent ends of the mold pan and closure with the pivoted end downwardly, pouring foam into the substantially V-shaped trough formed by the mold pan and closure, maintaining the ends of said trough closed in the portion containing latex, closing said mold progressively as the foam level rises therein, and maintaining the ends of the trough closed as the mold is closed.

8. A shaping mold for setting and curing a foamed latex mass without substantial compression thereof to form an elastic cushion article characterized by the absence of objectionable voids therein, comprising a molding pan having a mold cavity therein, a closure plate for the mold cavity, a multiplicity of individual cores secured to said closure plate and extending from said plate into the mold cavity, hinges securing said molding pan and said cover plate at one end of the mold cavity, side plates projecting from said mold pan along the sides of the mold cavity towards said cover plate, said cover plate having edges adapted to contact progressively said side plates during closing of the mold cavity as more of the closure plate is swung between the side plates about the hinge to close the mold cavity.

9. In the method of setting and vulcanizing a foamed latex mass to form an elastic cushion article, the steps which comprise disposing a mold having a mold pan and a closure therefor hinged together along one end of the mold cavity with the hinged end downwardly, pouring latex foam into the trough formed by the mold pan and closure, maintaining the ends of said trough closed by means of plates along the sides of said molding elements, closing said mold progressively as the foam level rises therein, and maintaining the trough closed by means of the plates as the mold is closed.

10. In the method of setting and vulcanizing a foamed latex mass to form an elastic cushion article, the steps which comprise providing a mold including a mold pan, finger-like cores and a closure for the mold pan hinged to the mold pan along one side of the mold cavity, disposing said mold with the hinged end downwardly, pouring latex foam into the trough formed by the mold pan and closure and simultaneously closing said mold progressively as the foam level rises therein and about said cores, and maintaining the ends of said trough closed by means of plates along the sides of said molding elements until the mold is closed.

References Cited in the file of this patent

UNITED STATES PATENTS

| | | |
|---|---|---|
| 678,359 | Davis | July 16, 1901 |
| 1,904,071 | Nelles | Apr. 18, 1933 |
| 2,351,529 | Luxenberger et al. | June 13, 1944 |
| 2,406,589 | Cunningham | Aug. 27, 1946 |
| 2,691,190 | Bethe et al. | Oct 12, 1954 |

FOREIGN PATENTS

| | | |
|---|---|---|
| 397,306 | Germany | Dec. 28, 1923 |